United States Patent
Mou (10) Patent No.: US 10,809,811 B2
(45) Date of Patent: Oct. 20, 2020

(54) METHOD FOR INVOKING LOCAL KEYBOARD ON HTML PAGE IN USER TERMINAL DEVICE AND APPARATUS THEREOF

(71) Applicant: Alibaba Group Holding Limited, Grand Cayman (KY)

(72) Inventor: Qiang Mou, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/586,187

(22) Filed: May 3, 2017

(65) Prior Publication Data

US 2017/0235378 A1    Aug. 17, 2017

Related U.S. Application Data

(63) Continuation of application No. PCT/CN2015/093313, filed on Oct. 30, 2015.

(30) Foreign Application Priority Data

Nov. 7, 2014    (CN) .......................... 2014 1 0625498

(51) Int. Cl.
*G06F 3/023*        (2006.01)
*G06F 9/451*        (2018.01)
(Continued)

(52) U.S. Cl.
CPC ............ *G06F 3/023* (2013.01); *G06F 3/0481* (2013.01); *G06F 3/0485* (2013.01);
(Continued)

(58) Field of Classification Search
CPC ........................... G06F 3/0238; G06F 3/04886
See application file for complete search history.

(56) References Cited

U.S. PATENT DOCUMENTS 7,768,501 B1 *  8/2010  Maddalozzo, Jr. .........................
                                           G06F 3/04886
                                                345/163
8,843,844 B2 *  9/2014  Laubach ............... G06F 3/0238
                                                715/773
(Continued)

FOREIGN PATENT DOCUMENTS

CN        101882082        11/2010
CN        103279306         9/2013
(Continued)

OTHER PUBLICATIONS

W3Schools.com, "HTML <input> Tag", https://www.w3schools.com/tags/tag_input.asp, web page as it appeared on Sep. 1, 2014 from Internet Archive: https://web.archive.org/web/20140901192929/https://www.w3schools.com/tags/tag_input.asp (Year: 2014).*

(Continued)

*Primary Examiner* — Scott T Baderman
*Assistant Examiner* — Benjamin Smith
(74) *Attorney, Agent, or Firm* — Lee & Hayes, P.C.

(57) ABSTRACT

A method and an apparatus for invoking a local keyboard on an HTML page in a user terminal device are disclosed. The method includes analyzing an HTML page when a user terminal device loads the HTML page, and generating a local input field at each page input field having a recognition identifier if page input field(s) having recognition identifier(s) and needing to invoke local keyboard(s) exist(s); setting a type of a local keyboard that needs to be invoked by each local input field; and transmitting input information received by the local input field through a corresponding local keyboard to the HTML page. By generating a local input field at a page input field having a recognition identifier, the present disclosure can implement (Continued)

an invocation of a local keyboard that cannot be invoked by a page input field through the local input field.

11 Claims, 3 Drawing Sheets

(51) Int. Cl.
- *G06F 16/958* (2019.01)
- *G06F 3/0481* (2013.01)
- *G06F 40/14* (2020.01)
- *G06F 3/0488* (2013.01)
- *G06F 3/0485* (2013.01)

(52) U.S. Cl.
CPC .......... *G06F 3/04886* (2013.01); *G06F 9/451* (2018.02); *G06F 16/986* (2019.01); *G06F 40/14* (2020.01); *G06F 2203/04804* (2013.01)

(56) References Cited

U.S. PATENT DOCUMENTS

| | | | | |
|---|---|---|---|---|
| 10,176,159 | B2* | 1/2019 | Vohra | G06F 16/93 |
| 2004/0237030 | A1* | 11/2004 | Malkin | G06F 17/243 |
| | | | | 715/222 |
| 2004/0237040 | A1* | 11/2004 | Malkin | G06F 17/2247 |
| | | | | 715/251 |
| 2006/0033724 | A1* | 2/2006 | Chaudhri | G06F 3/04883 |
| | | | | 345/173 |
| 2006/0036731 | A1* | 2/2006 | Mossman | H04L 63/10 |
| | | | | 709/225 |
| 2008/0235789 | A1* | 9/2008 | Erwin | G06F 16/954 |
| | | | | 726/19 |
| 2009/0006543 | A1* | 1/2009 | Smit | H04L 67/2842 |
| | | | | 709/203 |
| 2009/0109455 | A1* | 4/2009 | Smith | G06F 40/174 |
| | | | | 358/1.9 |
| 2010/0323762 | A1* | 12/2010 | Sindhu | G06F 1/1613 |
| | | | | 455/566 |
| 2011/0302520 | A1* | 12/2011 | Yuasa | G06F 3/04886 |
| | | | | 715/773 |
| 2012/0030557 | A1* | 2/2012 | Wiblin | G06F 17/243 |
| | | | | 715/226 |
| 2012/0072832 | A1* | 3/2012 | Tanaka | G06F 40/103 |
| | | | | 715/236 |
| 2012/0235921 | A1* | 9/2012 | Laubach | G06F 3/0238 |
| | | | | 345/172 |
| 2012/0274965 | A1* | 11/2012 | Yoshida | H04N 1/00384 |
| | | | | 358/1.13 |
| 2013/0024802 | A1 | 1/2013 | Zeng | |
| 2013/0285926 | A1* | 10/2013 | Griffin | G06F 3/04883 |
| | | | | 345/173 |
| 2013/0298071 | A1* | 11/2013 | Wine | G06F 3/04883 |
| | | | | 715/780 |
| 2013/0326339 | A1* | 12/2013 | Hagisawa | G06F 40/174 |
| | | | | 715/243 |
| 2014/0316937 | A1* | 10/2014 | Jiao | G06Q 30/0643 |
| | | | | 705/26.8 |
| 2014/0334732 | A1* | 11/2014 | Jung | G06F 3/04883 |
| | | | | 382/188 |
| 2015/0019413 | A1* | 1/2015 | Lazarus | G06K 9/6253 |
| | | | | 705/39 |
| 2015/0095833 | A1* | 4/2015 | Kim | G06F 3/04886 |
| | | | | 715/773 |
| 2015/0294578 | A1* | 10/2015 | Gil | G06F 40/166 |
| | | | | 434/309 |
| 2015/0317296 | A1* | 11/2015 | Vohra | G06F 16/93 |
| | | | | 715/221 |
| 2015/0331840 | A1* | 11/2015 | Shu | G06F 17/30905 |
| | | | | 715/234 |
| 2015/0347364 | A1* | 12/2015 | Zhang | G06F 3/04842 |
| | | | | 715/802 |
| 2018/0165255 | A1* | 6/2018 | Gafford | G09B 7/077 |

FOREIGN PATENT DOCUMENTS

| | | |
|---|---|---|
| CN | 103902057 | 7/2014 |
| CN | WO2014161347 A | 10/2014 |
| EP | 2518616 A1 | 10/2012 |
| JP | 2011254358 | 12/2011 |
| KR | 20080043850 A | 5/2008 |

OTHER PUBLICATIONS

Richard Clark; "HTML5 forms input types"; Feb. 28, 2013; 19 pages http://html5doctor.com/html5-forms-input-types/ (Year: 2013).*
Translation of International Search Report from corresponding PCT application No. PCT/CN2015/093313 dated Jan. 13, 2016, 2 pages.
Translation of Written Opinion from corresponding PCT application No. PCT/CN2015/093313 dated Jan. 13, 2016, 5 pages.
The Extended European Search Report dated May 7, 2018 for European Patent Application No. 15857549.8, 7 pages.
Translation of Office Action dated Sep. 27, 2017, from corresponding CN Patent Application No. 201410625498.0, 6 pages.
Translation of Search Report dated Sep. 19, 2017, from corresponding CN Patent Application No. 201410625498.0, 1 page.
The Japanese Office Action dated Mar. 12, 2019 for Japanese Patent Application No. 2017-523991, a counterpart of U.S. Appl. No. 15/586,187, 6 pages.
Pilgrim, "Introduction to HTML5", 1st edition, O'Reilly Japan, Inc., Apr. 21, 2011, pp. 169-187.
The European Office Action dated Jun. 11, 2019 for European Application No. 15857549.8, a counterpart foreign application of U.S. Appl. No. 15/586,187, 5 pages.
The Japanese Office Action dated Dec. 3, 2019, for Japanese Patent Application No. 2017-523991, a counterpart foreign application of U.S. Appl. No. 15/586,187, 6 pages.
The Korean Office Action dated Dec. 18, 2019 for Korean Patent Application No. 2017-7011819, a counterpart of U.S. Appl. No. 15/586,187, 4 pages.
The European Office Action dated Feb. 5, 2020 for European Application No. 15857549.8, a counterpart foreign application of U.S. Appl. No. 15/586,187, 10 pages.
Japanese Office Action dated Jun. 30, 2020, for Japanese Patent Application No. 2017-523991, a counterpart foreign applifations of U.S. Appl. No. 15/586,187, 9 pages.

* cited by examiner

METHOD FOR INVOKING LOCAL KEYBOARD ON HTML PAGE IN USER TERMINAL DEVICE AND APPARATUS THEREOF

CROSS REFERENCE TO RELATED PATENT APPLICATIONS

This application claims priority to and is a continuation of PCT Patent Application No. PCT/CN2015/093313, filed on 30 Oct. 2015, and is related to Chinese Patent Application No. 201410625498.0, filed on 7 Nov. 2014, entitled "Method for Invoking Local Keyboard on HTML Page in User Terminal Device and Apparatus thereof," which is hereby incorporated by reference in its entirety.

TECHNICAL FIELD

The present disclosure relates to the field of communications, and in particular to a technology for invoking a local keyboard on a Hyper Text Makeup Language (HTML) page in a user terminal device.

BACKGROUND

In a process of inputting information to a web page, some information needs to be inputted using a special keyboard to ensure the security or improve the input efficiency, for example, an input of some account passwords or online bank passwords, an input of an identity card number, or the like. However, some existing user terminals cannot invoke a portion of system built-in keyboards and customized keyboards on an HTML page due to respective systems limits. For example, a mobile terminal using an iOS system cannot invoke a local customized keyboard and a portion of keyboards built in the mobile terminal on an HTML5 page.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a method for invoking a local keyboard on an HTML page in a user terminal device and an apparatus thereof, to solve the problem of failing to invoking a system built-in keyboard and a customized keyboard on an HTML page.

To solve the above technical problem, the present disclosure discloses a method for invoking a local keyboard on an HTML page in a user terminal device. In implementations, the method may include analyzing an HTML page when the user terminal device loads the HTML page, and generating a local input field at each page input field having a recognition identifier if page input field(s) having recognition identifier(s) and needing to invoke local keyboard(s) exist(s), wherein the local input field covers a respective page input field at the same location; setting a type of a respective local keyboard that needs to be invoked by each local input field; and transmitting input information that is received by the local input field through a corresponding local keyboard to the HTML page.

The present disclosure further discloses an apparatus for invoking a local keyboard on an HTML page in a user terminal device. In implementations, the apparatus may include an analysis unit configured to analyze an HTML page when the user terminal device loads the HTML page, and determine whether page input field(s) having recognition identifier(s) and needing to invoke local keyboard(s) exist(s); a generation unit configured to generate a local input field at each page input field having a recognition identifier when a determination result of the analysis unit is affirmative, wherein the local input field covers a respective page input field at the same location; a setting unit configured to set a type of a respective local keyboard that needs to be invoked by each local input field; and a transmission unit configured to transmit input information that is received by the local input field through a corresponding local keyboard to the HTML page.

As compared with existing technologies, the present disclosure includes the following differences and effects.

By adding a recognition identifier to an input field of an HTML page, a local input field may be generated at a page input field having a recognition identifier to cover the page input field when the page is loaded. As such, the local input field implements an invocation of a local keyboard that cannot be invoked by the page input field.

Furthermore, the local input field is configured as a transparent input field, and a design pattern of the page input field in the entire HTML page may be preserved after being used for covering the page input field.

Moreover, prompt information of the page input field is transferred to the local input field that covers the page input field, thus preventing the generation of a ghost image of the prompt information when the local input field is a transparent input field.

In addition, if a currently loaded page has a local input field that is left by a previous page, a situation, in which a local keyboard is invoked at a location where an input is not needed or a local keyboard covers a page input field of the currently loaded page is not needed, may occur when a user clicks on the current page. Therefore, a local input field that is left behind needs to be removed first to prevent the occurrence of this situation.

DETAILED DESCRIPTION

A number of technical details are provided hereinafter to facilitate readers to understand the present application in a better manner. However, one of ordinary skill in the art can understand that technical solutions under the protection of the claims of the present application may also be implemented even without these technical details and various modifications and changes based on the following implementations.

The implementations of the present disclosure are described in further detail in conjunction with the accompanying drawings hereinafter to make the objectives, the technical solutions and the advantages of the present disclosure more clearly.

Figure 1:
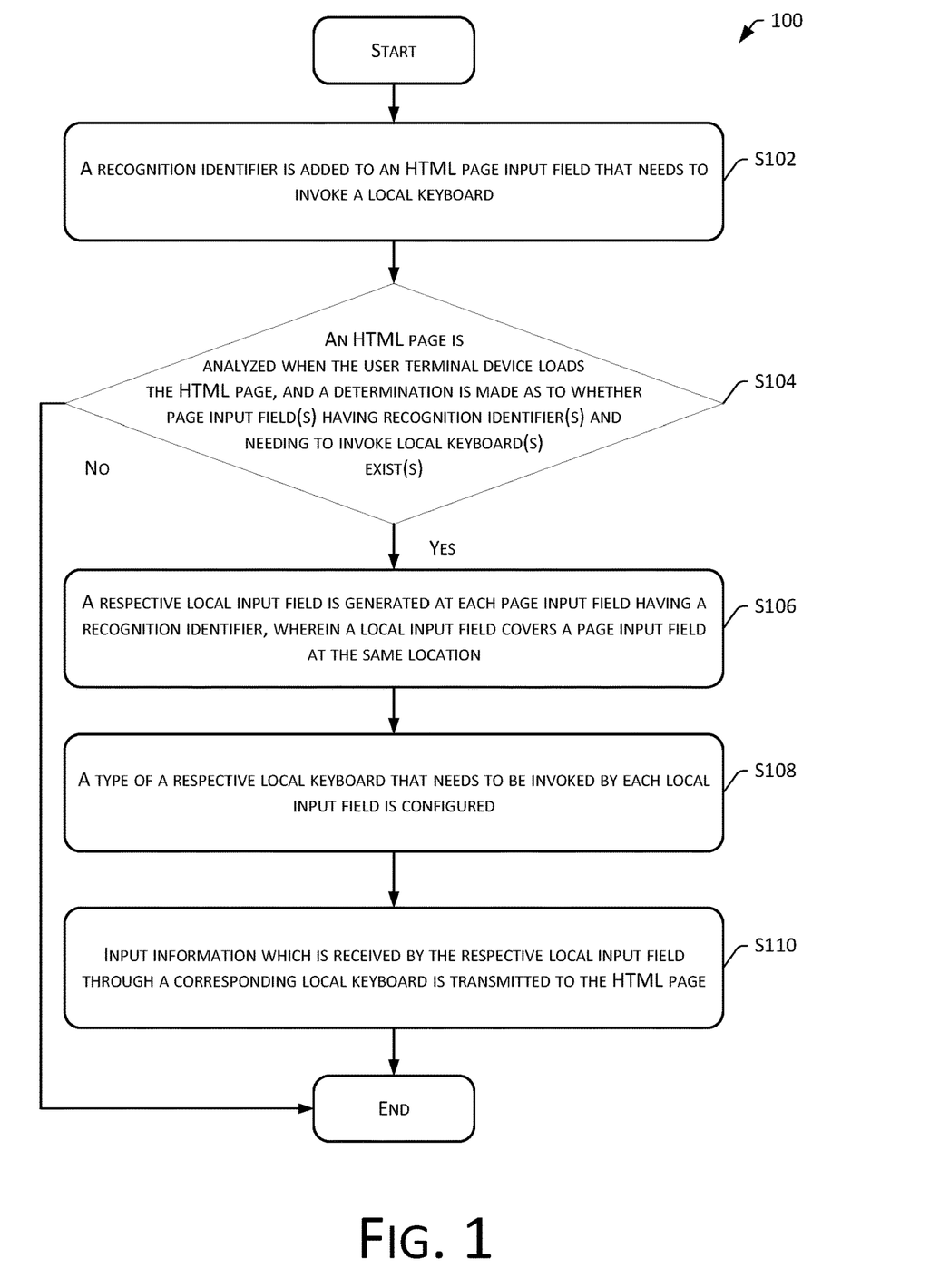
FIG. 1 is a flowchart of a method for invoking a local keyboard on an HTML page in a user terminal device according to a first implementation of the present disclosure.

In implementations, the present disclosure provides a method for invoking a local keyboard on an HTML page in a user terminal device. FIG. 1 is a flowchart of a method 100 for invoking a local keyboard on an HTML page in a user terminal device.

As shown in FIG. 1, the method 100 may include the following operations.

At S102, a recognition identifier is added to an HTML page input field that needs to invoke a local keyboard. Local keyboards refer to keyboards that a user terminal possess, which includes a system built-in keyboard and a customized keyboard of the terminal. A customized keyboard refers to a keyboard that is not provided in a system of a terminal which is designed according to a specific demand, for example, a numeric keypad that is only used for inputting a monetary amount, a keyboard that is only used for inputting an identity card number, etc. A page input field refers to a label INPUT of the HTML. A recognition identifier refers to an identifier used for distinguishing from other input fields which do not need to invoke a local keyboard, for example, adding a pattern category, an attribute, etc., to an INPUT label.

At S104, an HTML page is analyzed when the user terminal device loads the HTML page, and a determination is made as to whether page input field(s) having recognition identifier(s) and needing to invoke local keyboard(s) exist(s). The determination is made based on the recognition identifier that is added to the INPUT label at S102.

If a determination result is affirmative, S106 is performed. Otherwise, the process is ended.

At S106, a respective local input field is generated at each page input field having a recognition identifier. A local input field covers a page input field at the same location.

At S108, a type of a respective local keyboard that needs to be invoked by each local input field is configured. Respective types of local keyboards that need to be invoked by different local input fields may be the same or different, which may depend on keyboard type identifiers added to the page input fields.

At S110, input information which is received by the respective local input field through a corresponding local keyboard is transmitted to the HTML page.

The process is then ended.

In implementations, prior to S110, the method may further include determining whether a local input field invoking a local keyboard will be blocked by the invoked local keyboard, in response to receiving a triggering event of invoking the local keyboard for display; performing a response to a user input directly, and performing S110 after the user input is completed if a determination result is negative; and adjusting an offset of a scroll view of a webpage container of the user terminal device and a content height of the HTML page to enable the local input field invoking the local keyboard not to be blocked by the local keyboard if the determination result is positive.

Specifically, a view of a webpage container of the user terminal device may be scrolled so that the local input field invoking the local keyboard will not be blocked by the keyboard. When a webpage height is insufficient for scrolling to prevent the input field from being blocked, a content height of the HTML is increased, and the manner of increasing the height may include increasing the padding-bottom of a webpage body, or adding blank height place holder(s), etc.

Figure 2:
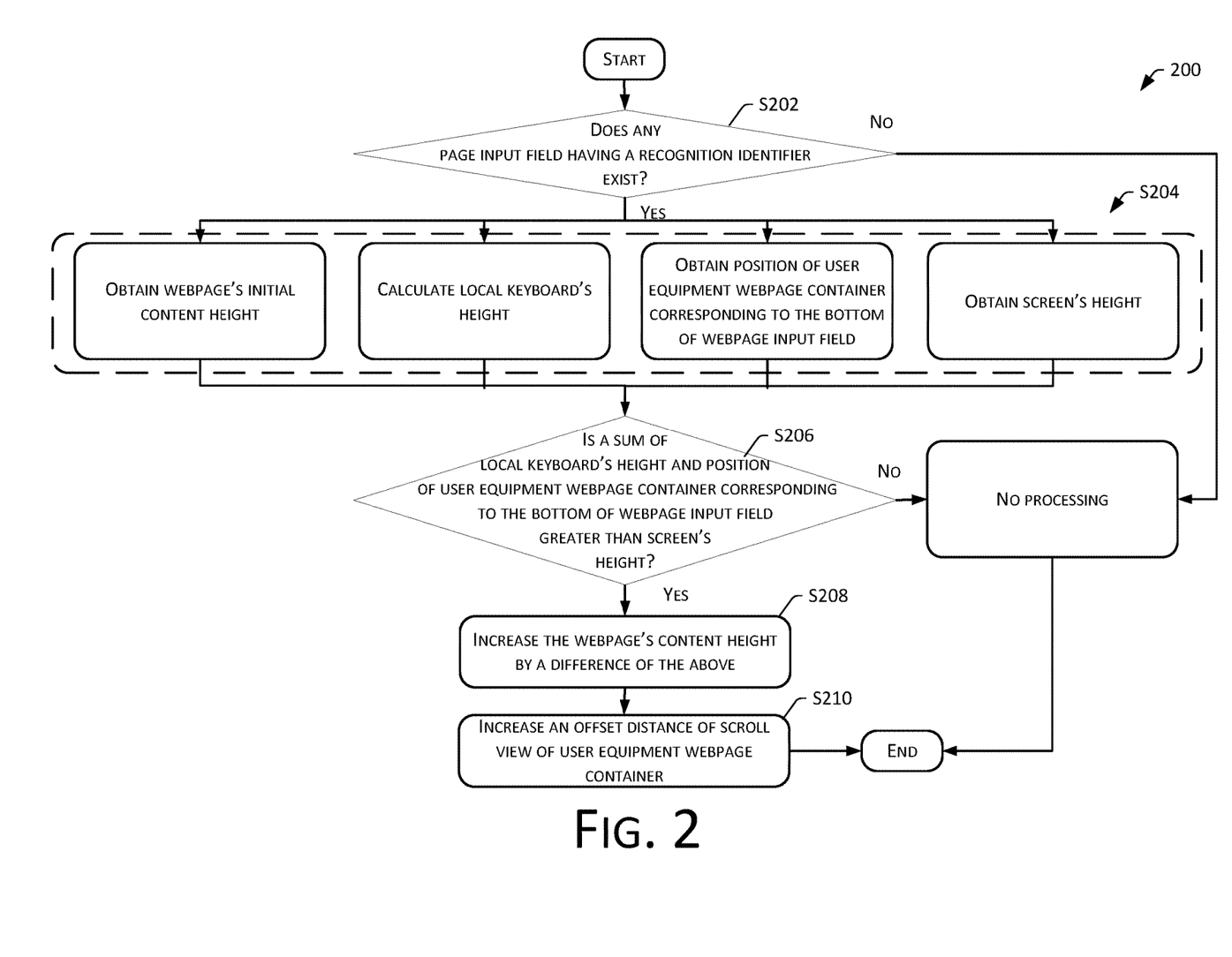
FIG. 2 is a flowchart of a method for preventing a local keyboard from obscuring a local input field according to the first implementation of the present disclosure.

In the above operation, a distance of the scrolling that needs to be conducted and the HTML content height that needs to be increased may be determined based on a height of the local keyboard, a position of the bottom of the page input field relative to the user equipment webpage container, and a height of a screen. As shown in FIG. 2, a determination is made as to whether a page input field having a recognition identifier exists in a webpage when the webpage is loaded at S202. In response to determining that a page input field having a recognition identifier exists in the webpage, a height of a local keyboard, a position of the bottom of the page input field relative to a user equipment webpage container, a height of a screen, and an initial content height of the webpage may be acquired at S204. A determination is then made as to whether a sum of the height of the local keyboard and the position of the bottom of the page input field relative to the user equipment webpage container is greater than the height of the screen at S206. If a determination result is positive, the webpage content height is increased at S208 and the offset of the scroll view of the user equipment webpage container is changed at S210. The increase in the webpage content height and the amount of the offset are a difference between a sum of the height of the keyboard and the position of the bottom of the page input field relative to the user equipment webpage container and the height of the screen. If the determination result is negative, no processing is performed.

Moreover, in implementations, prior to S110, the method may further include determining whether a content height of the current HTML page is an initial value in response to receiving a triggering event of hiding a local keyboard; and restoring the content height of the current HTML page to the initial value, and triggering scrolling of the HTML page if a determination result is negative, and performing S110 if the determination result is positive.

In the above implementations, an execution order of the processing after receiving a display event of invoking a local keyboard and the processing after receiving a trigger event of hiding a local keyboard is not fixed. One processing may be conducted after another processing, or both processing may be conducted in parallel.

Moreover, in implementations, S106 may include calculating location information of each page input field having the recognition identifier determined in the current HTML page, and acquiring an input type of each page input field having the recognition identifier; and generating the respective local input field at each page input field having the recognition identifier to cover the page input field at a corresponding location based on the location information and the input type, wherein the local input field is a transparent input field, and an input type of the local input field is identical to an input type of the page input field covered by the local input field.

It may be understood that a local input field is set as a transparent input field, such that a design pattern of a page input field in an entire HTML page may be preserved after the page input field is covered by the local input field.

Moreover, in implementations, S106 may further include adding prompt information included in a page input field having an input prompt into a local input field that covers the page input field, and removing the prompt information from the page input field.

It may be understood that transferring prompt information of a page input field into a local input field that covers the page input field can avoid generating a ghost image of the prompt information when the local input field is a transparent input field.

If a currently loaded HTML page includes a local input field that is left behind by a previous HTML page, a situation, in which a local keyboard is invoked out at a location where no input is needed or the local keyboard covers a page input field of the currently loaded HTML page, may occur when a user clicks on the current HTML page. Therefore, the local input field that is left behind needs to be removed in advance to avoid the occurrence of this situation. Therefore, in implementations, prior to S104, the method may further include determining whether a webpage container of the current user terminal device includes a generated local input field; removing the generated local input field if a determination result is positive; and directly performing S104 if the determination result is negative.

In implementations, the HTML page is an HTML5 page, and an iOS system runs in the user terminal device. Apparently, it can be understood that the method disclosed in the present disclosure may also be used to solve the problem if other versions of HTML pages or other operating systems of user terminal devices have the same problem.

By adding a recognition identifier to an input field of a HTML page, a local input field may be generated at a page input field having a recognition identifier to cover the page input field when the page is loaded. As such, the local input field can implement an invocation of a local keyboard that cannot be invoked by the page input field.

The method implementations of the present disclosure can all be implemented in a form of software, hardware, firmware, or the like. Regardless of whether the present disclosure is implemented by means of software, hardware or firmware, an instruction code can be stored in any type of computer accessible storage device (e.g., permanent or modifiable, volatile or non-volatile, solid-state or non-solid-state, fixed or replaceable media, etc.). Similarly, the storage device may be, for example, a Programmable Array Logic ("PLA"), a Random Access Memory ("RAM"), a Programmable Read Only Memory ("PROM"), a Read-Only Memory ("ROM"), an Electrically Erasable Programmable ROM ("EEPROM"), a magnetic disk, an optical disc, a Digital Versatile Disc ("DVD"), etc.

Figure 3:
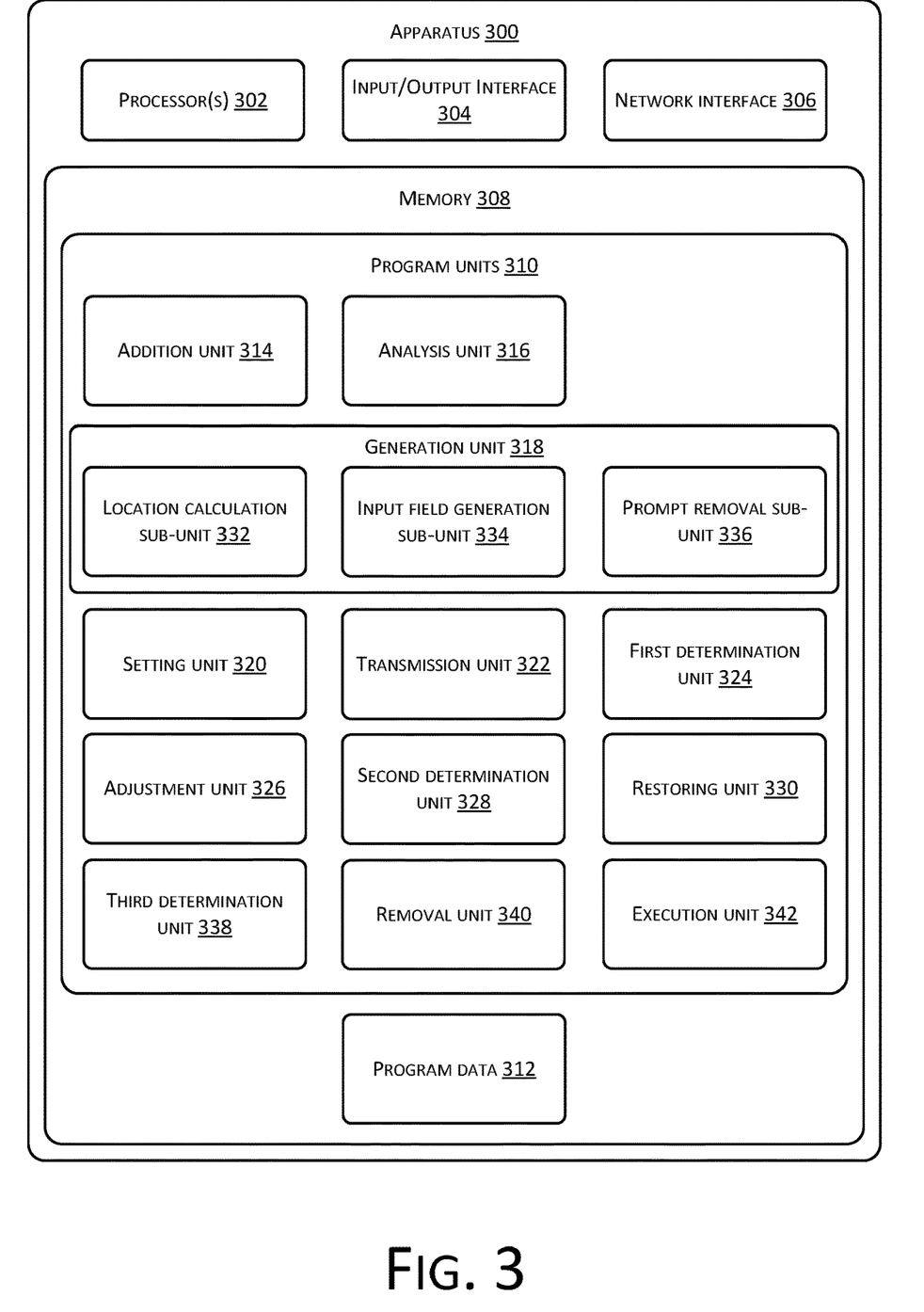
FIG. 3 is a structural diagram of an apparatus for invoking a local keyboard on an HTML page in a user terminal device according to a second embodiment of the present disclosure.

In implementations, the present disclosure further provides an apparatus for invoking a local keyboard on an HTML page in a user terminal device. FIG. 3 is a structural diagram of an apparatus 300 for invoking a local keyboard on an HTML page in a user terminal device.

As shown in FIG. 3, the apparatus 300 may include one or more processors 302, an input/output (I/O) interface 304, a network interface 306, and memory 308.

The memory 308 may include a form of computer-readable media, e.g., a non-permanent storage device, random-access memory (RAM) and/or a nonvolatile internal storage, such as read-only memory (ROM) or flash RAM. The memory 308 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves. For the ease of description, the system is divided into various types of units based on functions, and the units are described separately in the foregoing description. Apparently, the functions of various units may be implemented in one or more software and/or hardware components during an implementation of the present disclosure.

In implementations, the memory 308 may include program units 310 and program data 312. The program units 310 may include an addition unit 314 configured to add a recognition identifier on an HTML page input field that needs to invoke a local keyboard; an analysis unit 316 configured to analyze an HTML page when a user terminal device loads the HTML page, and determine whether page input field(s) having recognition identifier(s) and needing to invoke local keyboard(s) exist(s); a generation unit 318 configured to generate a local input field at each page input field having a recognition identifier when a determination result of the analysis unit is positive, wherein the local input field covers the respective page input field at a same location; a setting unit 320 configured to set a type of a local keyboard that needs to be invoked by each local input field; and a transmission unit 322 configured to transmit input information received by the local input field through a corresponding local keyboard to the HTML page.

Moreover, in implementations, the apparatus may further include a first determination unit 324, an adjustment unit 326, a second determination unit 328, and a restoring unit 330. The first determination unit 324 may determine whether the local input field invoking the local keyboard will be blocked by the invoked local keyboard after a triggering event of displaying the local keyboard is received. The adjustment unit 326 may adjust an offset of a scroll view of a webpage container of the user terminal device and a content height of the HTML page if a determination result of the first determination unit is positive, such that the local input field invoking the local keyboard will not be blocked by the local keyboard. In implementations, the scroll view of the webpage container of the user terminal device may be scrolled for a distance so that when a webpage height is insufficient for scrolling to make the input field visible, the content height of the HTML page is adjusted to prevent the local input field from being blocked by the invoked local keyboard. The second determination unit 328 may determine whether the content height of the HTML page is an initial value after a triggering event of hiding the local keyboard is received. The restoring unit 330 may restore the content height of the HTML page to the initial value when a determination result of the second determination unit is negative, and trigger scrolling of the HTML page.

Moreover, in implementations, the generation unit 318 may include a location calculation sub-unit 332 configured to calculate location information of each page input field having the recognition identifier determined in the current HTML page, and acquire an input type of each page input field having the recognition identifier; an input field generation sub-unit 334 configured to generate the local input field at each page input field having the recognition identifier to cover the page input field at a corresponding location based on the location information and the input type, wherein the local input field is a transparent input field, and an input type of the local input field is identical to an input type of the page input field covered by the local input field; and a prompt removal sub-unit 336 configured to add prompt information included in a page input field having an input prompt into a local input field that covers the page input field, and remove the prompt information from the page input field.

Moreover, in implementations, the apparatus 300 may further include a third determination unit 338 configured to determine whether a generated local input field in a webpage container of the user terminal device exists before the analysis unit analyzes the HTML page loaded by the user terminal device; a removal unit 340 configured to remove the generated local input field when a determination result of the third determination unit is positive; and an execution unit 342 configured to control the generation unit to generate the local input field at each page input field having the recognition identifier when the determination result of the third determination unit is negative.

The first implementation is a method embodiment corresponding to the present implementation. The present implementation may be implemented in conjunction with the first implementation. Related technical details mentioned in the first implementation are still effective in the present implementation, and are repeatedly described herein to reduce redundancy. Correspondingly, related technical details mentioned in the present implementation are also applicable to the first implementation.

It should be noted that the units mentioned in the apparatus implementations of the present disclosure are logical units. Physically, a logical unit may be implemented by a physical unit, a portion of a physical unit, or a combination of a plurality of physical units. Physical implementations of these logical units per se are not the most important, but a combination of functions implemented by the logical units is the key to solve the technical problem raised in the present disclosure. In addition, in order to highlight the innovative parts of the present disclosure, each apparatus implementation of the present disclosure does not introduce units that are not closely related to the technical problem raised in the present disclosure. However, this does not indicate that the apparatus implementations do not include other units.

It should be noted that relational terms such as "first" and "second" in the claims and specification of the present patent application are only used to differentiate one entity or operation from another entity or operation, but do not require or imply any actual relationship or order between these entities or operations. Moreover, terms such as "include", "comprise", or any variants thereof are intended to cover a non-exclusive inclusion, such that a process, a method, a product, or a device that includes a series of elements includes not only such elements but also other elements not specified expressly, or may further include inherent elements of the process, the method, the product, or the device. Without additional restrictions, an element limited by "include a/an . . . " does not exclude other same elements existing in the process, the method, the product, or the device that includes the element.

Although the present disclosure has been illustrated and described with reference to some exemplary implementations of the present disclosure, one of ordinary skill in the art should understand that various modifications can be made to the present disclosure in forms and details without departing from the spirit and scope of the present disclosure.

The invention claimed is:

1. A method implemented by a computing device, the method comprising:
improving efficiency of invoking a local keyboard by:
determining whether a webpage container of the computing device includes a previous local input field generated for a previous webpage;
removing the previous local input field in response to determining that the webpage container includes the previous local input field generated for the previous webpage;
analyzing a webpage when the computing device loads the webpage;
determining whether a page input field on the web page has a recognition identifier, the recognition identifier indicating that the page input field needs to invoke the local keyboard;
covering the page input field having the recognition identifier on the webpage by generating a local input field at the same location of the page input field having the recognition identifier, wherein the local input field is a transparent input field, and wherein generating the local input field at the same location of the page input field having the recognition identifier includes:
calculating location information of the page input field having the recognition identifier;
acquiring an input type of the page input field having the recognition identifier, wherein the page input field includes prompt information; and
generating the local input field at the same location of the page input field based on the location information and the input type of the page input field, wherein an input type of the local input field is identical to the input type of the page input field, and wherein generating the local input field at the same location of the page input field having the recognition identifier further comprises adding the prompt information included in the page input field into the local input field covering the page input field, and removing the prompt information from the page input field;
setting a type of the local keyboard to be invoked by the local input field; and
transmitting input information received by the local input field through the local keyboard to the webpage.

2. The method of claim 1, further comprising:
determining whether the local input field invoking the local keyboard is blocked by the local keyboard after a triggering event of displaying the local keyboard is received; and
adjusting an offset of a scroll view of a webpage container of the computing device and a content height of the webpage to enable the local input field invoking the local keyboard not to be blocked by the local keyboard in response to determining that the local input field invoking the local keyboard is blocked by the local keyboard.

3. The method of claim 2, further comprising:
determining whether the content height of the webpage is an initial value in response to receiving a triggering event of hiding the local keyboard; and
restoring the content height of the webpage to the initial value in response to determining that the content height of the webpage is not the initial value.

4. The method of claim 1, wherein the webpage comprises an HTML5 page, and the computing device runs a mobile operating system.

5. An apparatus comprising:
one or more processors;
memory coupled to the one or more processors, the memory storing executable instructions, executable by the one or more processors that when executed by the one or more processors cause the one or more processors to perform acts including:
improving efficiency of invoking a local keyboard by:
determining whether a webpage container includes a previous local input field generated for a previous webpage;
removing the previous local input field in response to determining that the webpage container includes the previous local input field generated for the previous webpage;
analyzing a webpage when the webpage is loaded, and determining whether a page input field on the web page has a recognition identifier, the recognition identifier indicating that the page input field needs to invoke the local keyboard;
covering the page input field having the recognition identifier on the webpage by generating a local input field at the same location of the page input field having the recognition identifier when a determination result of the analyzing is affirmative, wherein the local input field is a transparent input field, and wherein generating the local input field at the same location of the page input field having the recognition identifier includes:
calculating location information of the page input field having the recognition identifier;
acquiring an input type of the page input field having the recognition identifier, wherein the page input field includes prompt information; and
generating the local input field at the same location of the page input field based on the location information and the input type of the page input field, wherein an input type of the local input field is identical to the input type of the page input field, and wherein generating the local input field at the same location of the page input field having the recognition identifier further comprises adding prompt information included in the page input field into the local input field covering the page input field, and removing the prompt information from the page input field;
setting a type of the local keyboard to be invoked by the local input field; and
transmitting input information received by the local input field through the local keyboard to the webpage.

6. The apparatus of claim 5, the acts further comprising:
determining whether the local input field invoking the local keyboard is blocked by the local keyboard after a triggering event of displaying the local keyboard is received; and
adjusting an offset of a scroll view of a webpage container and a content height of the webpage to enable the local input field invoking the local keyboard not to be blocked by the local keyboard, in response to determining that the local input field is blocked by the local keyboard.

7. The apparatus of claim 6, the acts further comprising:
determining whether the content height of the webpage is an initial value after a triggering event of hiding the local keyboard is received; and
restoring the content height of the webpage to the initial value in response to determining that the content height of the webpage is not the initial value.

8. One or more computer-readable media storing executable instructions that, when executed by one or more processors, cause the one or more processors to perform acts comprising:
improving efficiency of invoking a local keyboard by:
determining whether a webpage container includes a previous local input field generated for a previous webpage;
removing the previous local input field in response to determining that the webpage container includes the previous local input field generated for the previous webpage;
analyzing a webpage when the webpage is loaded;
determining whether a page input field on the web page has a recognition identifier, the recognition identifier indicating that the page input field needs to invoke the local keyboard;
covering the page input field having the recognition identifier on the webpage by generating a local input field at the same location of the page input field having the recognition identifier, wherein the local input field is a transparent input field, and wherein generating the local input field at the same location of the page input field having the recognition identifier includes:
calculating location information of the page input field having the recognition identifier;
acquiring an input type of the page input field having the recognition identifier, wherein the page input field includes prompt information; and
generating the local input field at the same location of the page input field based on the location information and the input type of the page input field, wherein an input type of the local input field is identical to the input type of the page input field, and wherein generating the local input field at the same location of the page input field having the recognition identifier further comprises adding the prompt information included in the page input field into the local input field covering the page input field, and removing the prompt information from the page input field;
setting a type of the local keyboard to be invoked by the local input field; and
transmitting input information received by the local input field through the local keyboard to the webpage.

9. The one or more computer-readable media of claim 8, the acts further comprising:
determining whether the local input field invoking the local keyboard is blocked by the local keyboard after a triggering event of displaying the local keyboard is received; and
adjusting an offset of a scroll view of a webpage container and a content height of the webpage to enable the local input field invoking the local keyboard not to be blocked by the local keyboard in response to determining that the local input field invoking the local keyboard is blocked by the local keyboard.

10. The one or more computer-readable media of claim 9, the acts further comprising:

determining whether the content height of the webpage is an initial value in response to receiving a triggering event of hiding the local keyboard; and restoring the content height of the webpage to the initial value in response to determining that the content height of the webpage is not the initial value.

11. The one or more computer-readable media of claim 8, wherein the webpage comprises an HTML5 page.

* * * * *